US008374561B1

(12) United States Patent
Yung et al.

(10) Patent No.: US 8,374,561 B1
(45) Date of Patent: Feb. 12, 2013

(54) NON-FOSTER IMPEDANCE POWER AMPLIFIER

(75) Inventors: Michael W. Yung, Los Angeles, CA (US); Donald A. Hitko, Grover Beach, CA (US)

(73) Assignee: HRL Laboratories, LLC, Malibu, CA (US)

(*) Notice: Subject to any disclaimer, the term of this patent is extended or adjusted under 35 U.S.C. 154(b) by 352 days.

(21) Appl. No.: 12/768,563

(22) Filed: Apr. 27, 2010

(51) Int. Cl.
H04B 1/04 (2006.01)
(52) U.S. Cl. .................. 455/129; 455/120; 343/860
(58) Field of Classification Search .......... 455/129, 455/120, 121, 124, 107; 343/752, 820, 822, 343/850, 860; 330/282, 291–294, 76, 86
See application file for complete search history.

(56) References Cited

U.S. PATENT DOCUMENTS

2002/0041205 A1* 4/2002 Oppelt ..................... 330/61 A

OTHER PUBLICATIONS

Slideshow for "Matching Network Design Using Non-Foster Impedances" by Stephen E. Sussman-Fort, Ph.D. of EDO Corporation (printed from the Internet on Jun. 30, 2011) (43 pages).
EDO Corporation, "Increasing Efficiency or Bandwidth of Electrically Small Transmit Antennas by Impedance Matching with Non-foster Circuits" S.E. Sussman-Fort and R.M. Rudish, Progress in Electromagnetics Research Symposium 2006, Cambridge, USA, Mar. 26-29, 2006 (Abstract only).
"A Heuristic Approach to Teaching Negative Resistance Phenomenon" by Cyril Svetoslavov Mechkov, Third International Conference—Computer Science '06, Istanbul, Turkey, Oct. 12-15, 2006 (6 pages).
White Paper by the Virginia Tech Antenna Group of Wireless @ Virgina Tech "Non-Foster Reactance Matching for Antennas," pp. 1-5 <http://wireless.vt.edu/research/Antennas_Propagation/Whitepapers/Whitepaper-Non-Foster_Reactance_Matching_for_Antennas.pdf>.
EDO Corporation, "Increasing Efficiency or Bandwidth of Electrically Small Transmit Antennas by Impedance Matching with Non-foster Circuits" S.E. Sussman-Fort and R.M. Rudish, Progress in Electromagnetics Research Symposium 2006, Cambridge, USA, Mar. 26-29.
EDO Corporation, and Dept. of Electrical and Computer Engineering, "Non-Foster Impedance Matching for Transmit Applications" S.E. Sussman-Fort and R.M. Rudish, IEEE Xplore, pp. 53-56.
EDO Corporation, "Increasing Efficiency or Bandwidth of Electrically Small Transmit Antennas by Impedance Matching with Non-foster Circuits" S.E. Sussman-Fort and R.M. Rudish, Progress in Electromagnetics Research Symposium 2006, Cambridge, USA, Mar. 26-29, 2006.
EDO Corporation, and Dept. of Electrical and Computer Engineering, "Non-Foster Impedance Matching for Transmit Applications" S.E. Sussman-Fort and R.M. Rudish, IEEE Xplore, pp. 53-56, Mar. 6-8, 2006.
Stephen E. Sussman-Fort, "Gyrator-Based Biquad Filters and Negative Impedance Converters for Microwaves," *International Journal of RF and Microwave Computer-Aided Engineering*, vol. 8, No. 2, pp. 86-101, 1998.
Stephen E. Sussman-Fort, "Matching Network Design Using Non-Foster Impedances," *International Journal of RF and Microwave Computer-Aided Engineering*, vol. 16, Issue 2, pp. 135-142, Feb. 2006.

*Primary Examiner* — Christian Hannon
(74) *Attorney, Agent, or Firm* — Ladas & Parry

(57) ABSTRACT

A non-Foster impedance power amplifier has a current amplifying device coupled in either an emitter-follower or source-follower configuration with a reactive load such as an antenna load. A negative impedance circuit is provided upstream of a gate or base or other control element of said current amplifying device.

26 Claims, 3 Drawing Sheets

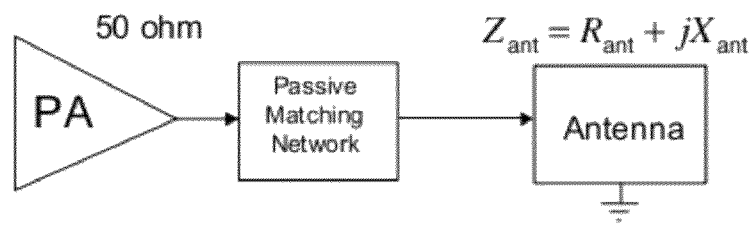
Fig. 1     (Prior Art)
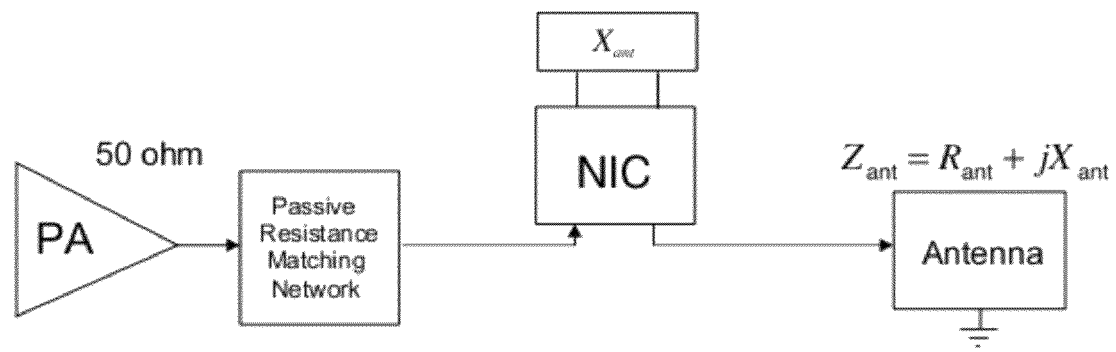
Fig. 2     (Prior Art)

NON-FOSTER IMPEDANCE POWER AMPLIFIER

CROSS REFERENCE TO RELATED APPLICATIONS

None

TECHNICAL FIELD

This disclosure relates to Non-Foster power amplifiers of the type which are typically used to drive an antenna.

BACKGROUND

In a conventional transmitter system, a passive matching network is inserted between the output of the Power Amplifier (PA) and the antenna to match the output impedance of the PA (typically 50 ohms) to that of the antenna, as shown in FIG. 1. Passive matching networks typically include one or more capacitors and one or more inductors arranged in well-known configurations. These passive networks receive power only from their source (typically the PA) and do not need any external source of power. These passive networks comply with Foster's Reactance Theorem. Passive Foster networks work fairly well in matching the impedance of the PA to the impedance the antenna at a single frequency. But they are not perfect, even at a single frequency, since inductors and capacitors in the real world are non-ideal, that is, they have resistance in addition to reactance. Moreover, most practical applications require a transmitter to operate over a bandwidth and especially when physically small size antennas are utilized, it is often not possible to achieve an acceptable or desirable impedance match over an acceptable or desirable bandwidth using Foster (passive) networks. Antennas of small physical size are frequently used in hand-held applications such as cell phones, smart phones, lap top or smaller computers, and so on. For additional background information, see Stephen E. Sussman-Fort, Ron M. Rudish, "Non-Foster Impedance Matching for Transmit Applications," 2006 *IEEE International Workshop on Antenna Technology Small Antennas and Novel Metamaterials*, pp. 53-56, Mar. 6-8, 2006 and Stephen E. Sussman-Fort, Ron M. Rudish, "Increasing Efficiency or Bandwidth of Electrically-Small Transmit Antennas by Impedance Matching with Non-Foster Circuits," *PIERS* 2006, Mar. 26-29, 2006.

Better impedance matching can be achieved using Non-Foster (or active) networks. Non-Foster (or active) networks require a source of power (typically DC) in addition to that provided by merely being coupled to the output of the PA. These networks may utilize a Negative Impedance Convertor (NIC). So in an actively matched transmitter system, a NIC can be inserted between the PA and the antenna to cancel the reactance of the antenna, while another resistance matching network provides the resistance match to the antenna, as shown in FIG. 2. A number of different designs for NICs are known per se in the prior art. See, for example, Stephen E. Sussman-Fort, "Gyrator-Based Biquad Filters and Negative Impedance Converters for Microwaves," *International Journal of RF and Microwave Computer-Aided Engineering*, Vol. 8, No. 2, pp. 86-101, 1998, the disclosure of which is hereby incorporated herein by reference.

A disadvantage of the configuration of FIG. 2 is that the RF voltage swing across the NIC is scaled up by approximately $X_{ant}/R_{ant}$. The DC bias voltage of the NIC needs to be scaled up also to support this swing, hence causing higher power dissipation. This directly impacts the efficiency of the transmitter.

The present state-of-the-art of power amplifiers for antennas with non-Foster active matching use a NIC to invert the phase of an inductive or capacitive element to provide a broadband cancellation of the reactance of an electrically small antenna. This improves the efficiency and bandwidth of the PA by presenting it a resistive load, but comes at a cost of high power dissipation in the NIC. Despite the improved match, the combined power dissipation of the NIC and PA in a typical prior art application exceeds that of just having the PA drive an unmatched antenna, a consideration which has thus far limited the practicality of using NICs in real world applications.

Alternative techniques include using more complex matching structures and antenna designs, but these can only approach the well-established Chu limit on bandwidth for passive matching to a reactive antenna as a function of the antenna size. The circuits disclosed herein break (exceed) the Chu limit on bandwidth by using non-Foster impedances for matching, while also circumventing the limitations of current non-Foster matching techniques.

Impedance matching of the PA to antenna has been conventionally treated as an interface problem where the solution was provided either by passive impedance matching network or by an active matching circuit. The use of a NIC as the active matching circuit has been proposed before but did not receive a lot of attention because of the difficulty in making a stable and efficient NIC, especially in a transmit application. This disclosure addresses the efficiency problem. For stability issues the reader is directed to Stephen E. Sussman-Fort, "Matching Network Design Using Non-Foster Impedances," *International Journal of RF and Microwave Computer-Aided Engineering*, Vol. 16, Issue 2, pp. 135-142, February 2006.

BRIEF DESCRIPTION OF THE INVENTION

In one aspect the present invention provides a method of increasing transmitter efficiency and bandwidth of a transmitter coupled to an antenna load, wherein the transmitter has a current amplifying device coupled in either an emitter-follower or source-follower configuration with the antenna load. The method includes inserting a negative impedance circuit between a passive resistance matching network and a gate or base element of the current amplifying device.

In another aspect the present invention provides a non-Foster impedance power amplifier for driving an antenna load. The non-Foster impedance power amplifier includes a current amplifying device coupled in either an emitter-follower or source-follower configuration with the antenna load; and a negative impedance circuit disposed between a passive resistance matching network and a gate or base element of the current amplifying device.

BRIEF DESCRIPTION OF THE DRAWINGS

FIG. 1 depicts a schematic diagram of a conventional power amplifier (PA) passively matched to an antenna.

FIG. 2 depicts a schematic diagram of a conventional power amplifier (PA) actively matched to antenna using an NIC and a resistance matching network known in the prior art.

DETAILED DESCRIPTION

Figure 3A:
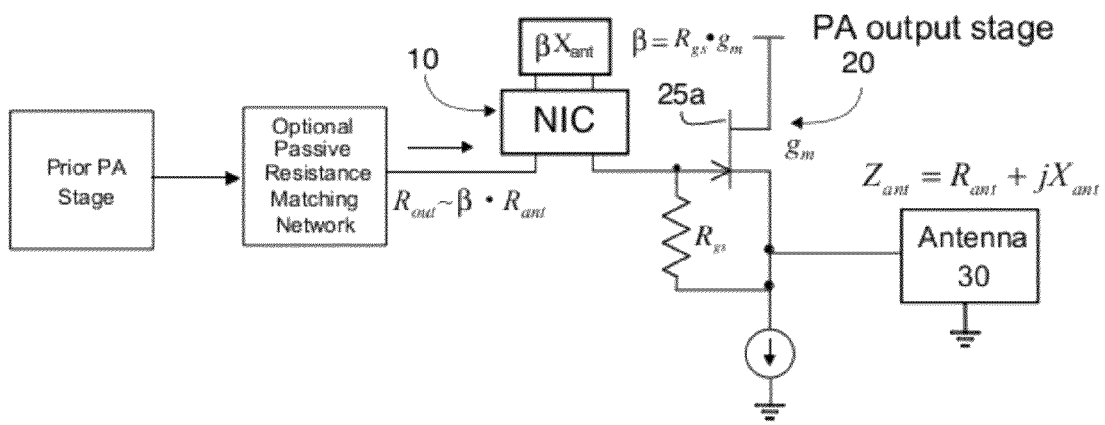
FIGS. 3a and 3b are a schematic diagrams of embodiments of a Non-Foster PA circuit providing wideband reactance cancellation and low output resistance for driving electrically small antennas, FIG. 3a being an embodiment with a field effect transistor (FET) device and FIG. 3b being an embodiment with a bipolar junction transistor (BJT) device.
Figure 3B:
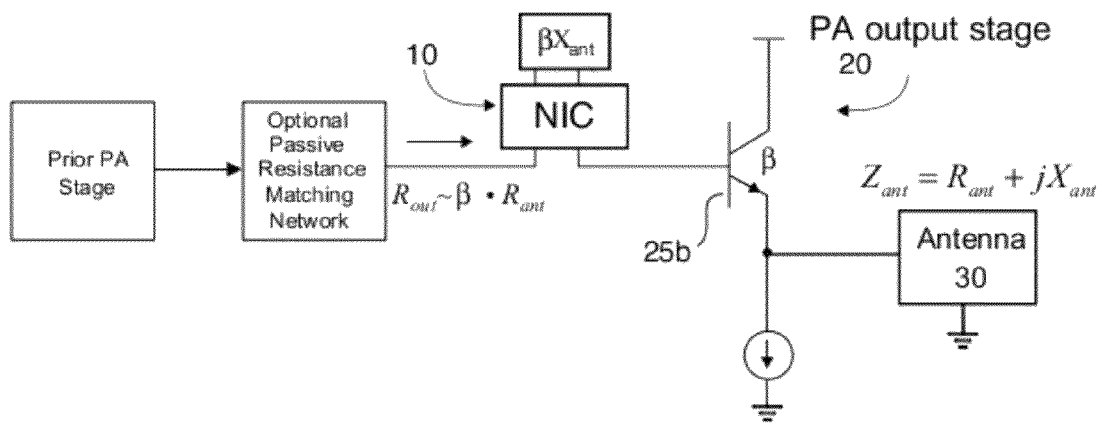

The key to improving transmitter efficiency while maintaining the bandwidth achieved with the non-Foster impedance is to move the NIC circuit 10 before the output stage 20 of the PA as shown in FIGS. 3a and 3b. FIG. 3b depicts an embodiment utilizing a FET device 25a in the output stage 20 while FIG. 3b depicts an embodiment using a BJT or any current amplifying device 25b in the output stage 20. By operating the NIC 10 where the signal levels are smaller, the overall transmitter efficiency is increased by the power gain realized in the output stage 20. Furthermore, by utilizing a low resistance source-follower (see FIG. 3a) or emitter-follower (see FIG. 3b) output stage 20 after the NIC 10, the PA is better suited to driving the low resistance of an electrically small antenna 30. The source-follower or emitter-follower output stage 20 effectively achieves a broadband impedance transformation, where the impedance seen at its gate (see FIG. 3a) or base (see FIG. 3b) is larger than that at the antenna 30 by a factor equal to the current (and power) gain of the source-follower (FIG. 3a) or emitter-follower (FIG. 3b) which is shown as β in FIGS. 3a and 3b. This property allows the NIC 10 to operate at resistance levels higher than that of the antenna 30 for greater system efficiency, a property that can be exploited by using the NIC 10 to provide the first stage of power gain in the non-Foster PA. The trade for placing the NIC 10 before the output stage 20 is that the reactance being inverted must also be larger by the factor β, but making this component larger (either by using a larger passive component or via an active impedance generating circuit) does not increase power consumption.

The current gain (β) in the non-Foster PA is a design parameter and may be explicitly set by choosing the value of the extrinsic resistor $R_{gs} = \beta/g_m$, where $g_m$ is the transconductance of the source-follower device 25a (a FET-type device, for example) selected as shown in FIG. 3a or β is set by selection of the intrinsic β of the BJT or other current amplifying device 25b selected as shown in FIG. 3b.

If an emitter-follower device 25b (a BJT-type device, for example) is used in the PA as shown in FIG. 3b, then no extrinsic resistor (like $R_{gs}$) is needed. But a resistor $R_{be}$ (similar to $R_{gs}$ in FIG. 3a) can be connected across the base and emitter of device 25b to modify the current gain of that device. The net current gain is approximately equal to the parallel combination of $g_m \times R_{be}$ and the intrinsic beta (β) of the device 25b.

Two embodiment utilizing this invention have been presented using a current amplifying device, the FET 25a of FIG. 3a and the BJT of FIG. 3b. Basically speaking, any 3-terminal active device that has gain can potentially work. This includes, but is not limited to, MOSFETs, JFETs (junction FETs), MESFETs (metal semiconductor FETs), BJTs, HBTs (heterojunction bipolar transistors), HFETs (heterostructure FETs) aka HMETs (high electron mobility transistors), etc.

Figure 4:
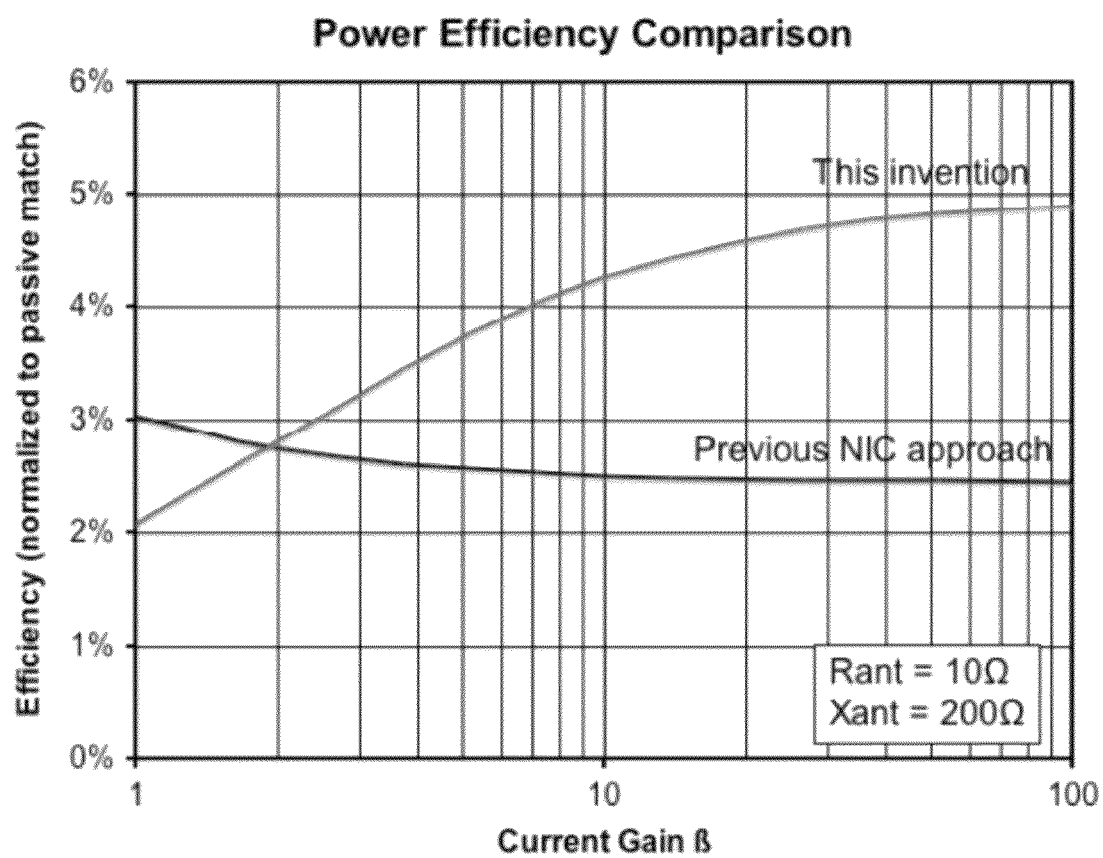
FIG. 4 is a graph showing a plot of normalized power efficiency of the present invention compared to that of the prior art NIC approach when the power of the PA output stage is included in the analysis.

The performance of this approach is summarized relative to the prior approaches in FIG. 4, where the power efficiency of the present invention normalized to that of passive matching is plotted against that of the prior art NIC approach (the power of the PA output stage is included in the analysis). As can be seen, when the current gain (β) exceeds 2, the approaches suggested herein improve the efficiency of the PA compared to the previous non-Foster based matching approach (shown by FIG. 2). The power saved from the NIC due to smaller voltage swing when moving it before the output stage is partially offset by the extra power consumed by the output stage itself which now sees a higher voltage swing. But since the NIC contains at least two active devices while the output stage has only one active device, the potential power efficiency of the circuit in FIG. 3 should improve up to 200% relative to that in FIG. 2.

Compared to the NIC in FIG. 2, the NIC of the approach suggested herein needs to cancel a reactance β times higher because of the impedance transformation going from the source to the gate of the output device. A passive reactance $\beta X_{ant}$ is utilized at the other end of the NIC to generate this more negative reactance.

An additional advantage of the present invention is that it can provide resistance matching by stepping up the typically small resistance of the electrically small antenna 30 by a factor of β (the current gain of the PA output stage) to match, for example, a 50 ohm output resistance of an earlier stage of the PA (see in FIGS. 3a and 3b, $R_{out} \sim \beta \times R_{ant}$ on the left hand side of these figures). This can eliminate a need for the depicted Passive Resistance Matching Network shown in FIGS. 3a and 3b. So selecting appropriate values of β of the output stage 20 and $R_{ant}$ of the antenna 30 can lead to the elimination of any need for a resistance matching network between the NIC 10 and the prior stage of the PA.

This invention offers the potential to overcome present limitations to using electrically small antennas in real world systems—including narrow instantaneous bandwidth and poor power-efficiency—for broadband operation at frequencies from tens of MHz and up. A traditional passive-matched antenna designed for 100 MHz may have only 10-15% bandwidth. The use of a non-Foster impedance to match a reactive antenna (as done in the prior art—see FIG. 2) results in improved bandwidth, but at a poor operating efficiency (e.g., $P_{out}/P_{diss} \sim 1\%$). In the prior art, the gain provided by the PA gets basically absorbed by the downstream NIC. By improving efficiency and bandwidth, this invention makes electrically small antennas much more practical.

Having described the invention in connection with certain embodiments thereof, modification will now suggest itself to those skilled in the art. For example, the present invention could be used with reactive loads other than just antennas or with other current amplifying devices than the transistors described above. As such, the invention is not to be limited to the disclosed embodiments except as is specifically required by the appended claims.

What is claimed is:

1. A method of increasing transmitter efficiency and bandwidth of a transmitter power amplifier coupled to an antenna load, wherein the transmitter has an output stage having a current amplifying device coupled in either an emitter-follower or source-follower configuration with said antenna load, said method comprising inserting a negative impedance circuit between a gate or base element of said current amplifying device and a prior stage of said transmitter power amplifier.

2. The method of claim 1 wherein the current amplifying device is a field effect transistor device.

3. The method of claim 1 wherein the current amplifying device is a bipolar junction transistor device.

4. The method of claim 1 wherein the negative impedance circuit is coupled between the gate or base element of said current amplifying device and the prior stage of said transmitter power amplifier via a passive resistance matching network.

5. The method of claim 1 wherein the negative impedance circuit is coupled between the gate or base element of said current amplifying device and the prior stage of said transmitter power amplifier without an intervening passive resistance matching network.

6. A non-Foster impedance power amplifier for driving a reactive load, the non-Foster impedance power amplifier comprising:
   a current amplifying device coupled in either an emitter-follower or source-follower configuration with the reactive load; and
   a negative impedance circuit coupled to a gate or base element of said current amplifying device.

7. The non-Foster impedance power amplifier of claim 6 wherein the current amplifying device is a field effect transistor device.

8. The non-Foster impedance power amplifier of claim 6 wherein the current amplifying device is a bipolar junction transistor device.

9. The non-Foster impedance power amplifier of claim 6 wherein the negative impedance circuit is coupled between the gate or base element of said current amplifying device and a prior stage of said non-Foster impedance power amplifier via a passive resistance matching network.

10. The non-Foster impedance power amplifier of claim 6 wherein the negative impedance circuit is coupled between the gate or base element of said current amplifying device and a prior stage of said non-Foster impedance power amplifier without an intervening passive resistance matching network.

11. The non-Foster impedance power amplifier of claim 6 wherein the reactive load is an antenna.

12. A non-Foster impedance power amplifier output stage having an input, the non-Foster impedance power amplifier output stage comprising:
   a current amplifying circuit having an input; and
   a negative impedance circuit coupled in series between the input of the current amplifying circuit and the input of the non-Foster impedance power amplifier output stage.

13. A method of coupling a power amplifier to a reactive load, wherein the power amplifier has an output stage having a current amplifying device coupled in either an emitter-follower or source-follower configuration with said reactive load, said method comprising inserting a negative impedance circuit between a control element of said current amplifying device and a prior stage of said power amplifier.

14. The method of claim 13 wherein the current amplifying device is a field effect transistor and said control element is a gate of said field effect transistor.

15. The method of claim 13 wherein the current amplifying device is a bipolar junction transistor said control element is a base of said bipolar junction transistor.

16. The method of claim 1 wherein the negative impedance circuit is coupled between the control element of said current amplifying device and the prior stage of said transmitter power amplifier via a passive resistance matching network.

17. The method of claim 1 wherein the negative impedance circuit is coupled between the control element of said current amplifying device and the prior stage of said transmitter power amplifier without an intervening passive resistance matching network.

18. A non-Foster impedance matching circuit comprising a negative impedance circuit coupled to a reactive load via a means for increasing a reactance tolerated by the negative impedance circuit by a factor beta.

19. The non-Foster impedance matching circuit of claim 18 wherein the means for increasing a reactance tolerated by the negative impedance circuit by a factor beta comprises a transistor having a current gain equal to beta.

20. The non-Foster impedance power amplifier output stage of claim 12 wherein said non-Foster impedance power amplifier output stage comprises an output stage of a power amplifier for coupling, in use, to an antenna, the input of the non-Foster impedance power amplifier output stage being coupled to a prior stage of said power amplifier.

21. The non-Foster impedance power amplifier output stage of claim 20 wherein the current amplifying circuit comprises a field effect transistor device.

22. The non-Foster impedance power amplifier output stage of claim 21 wherein the negative impedance circuit is coupled between the gate of said field effect transistor device and the prior stage of said power amplifier.

23. The non-Foster impedance power amplifier output stage of claim 21 wherein the negative impedance circuit is coupled between the gate of said field effect transistor device and the prior stage of said power amplifier via a passive matching network.

24. The non-Foster impedance power amplifier output stage of claim 20 wherein the current amplifying circuit comprises a bipolar junction transistor device.

25. The non-Foster impedance power amplifier output stage of claim 24 wherein the negative impedance circuit is coupled between the base element of said bipolar junction transistor device and the prior stage of said power amplifier.

26. The non-Foster impedance power amplifier output stage of claim 24 wherein the negative impedance circuit is coupled between the base element of said bipolar junction transistor device and the prior stage of said power amplifier via a passive matching network.

* * * * *